Patented Aug. 30, 1949

2,480,467

UNITED STATES PATENT OFFICE 2,480,467

PRODUCTION OF TRIFLUOROACETIC ACID COMPOUNDS

Walter Norman Haworth and Maurice Stacey, Birmingham, England, assignors to Minister of Supply in His Majesty's Government of the United Kingdom of Great Britain and Northern Ireland, London, England No Drawing. Application September 17, 1946, Serial No. 697,576. In Great Britain October 1, 1945

9 Claims. (Cl. 260—539)

This invention relates to the production of organic compounds, and more particularly to the production of trifluoroacetic acid and derivatives thereof.

According to the present invention, a process for the production of trifluoroacetic acid and derivatives thereof comprises reacting acetone with fluorine in the vapour phase and subsequently reacting trifluoroacetyl fluoride in the gaseous reaction product with an aqueous solution of an alkali metal hydroxide or alkaline earth metal hydroxide.

The reaction with fluorine may be carried out by passing separate streams of acetone and of fluorine, at least one of which should be diluted with nitrogen, into a reaction vessel packed with a fluorination catalyst such as copper turnings or copper gauze coated with silver or with gold, and maintained at an elevated temperature of the order of 200° C. to 250° C. Advantageously the two separate streams of reactants are introduced into one end of the catalyst mass so that they mingle, and the mixed vapours then pass through the mass, the resulting gaseous reaction product then leaving the reaction vessel to pass through a cooling device. After cooling to remove by-products and removing hydrogen fluoride, the gases are contacted with an aqueous solution of an alkali metal hydroxide or an alkaline earth metal hydroxide. Trifluoroacetyl fluoride is formed during the first stage of the reaction and on reaction with the aqueous base forms a salt of trifluoroacetic acid which can be isolated subsequently and worked up in any desired manner.

Thus in one form of the invention nitrogen is bubbled through acetone in a container, the resultant mixture of acetone vapor and nitrogen being heated to approximately 200° C. in a preheater and then passed into the upper part of an iron reactor filled with gold-plated copper turnings. A separate stream of fluorine diluted with nitrogen and similarly preheated to 200° C. is also passed into the upper part of the reactor. If desired, one or more baffle plates may be fitted so as to direct the incoming streams of reactants into the copper turnings so that they mix there rather than in any free space there may be above the catalyst. Suitably the supplies of reactants are regulated so that there remains some unreacted fluorine in the mixed gases issuing from the reactor. This will correspond to the use of between 10 mols and 12 mols of fluorine for each mol of acetone. The temperature in the reactor should preferably be between 200° C. and 250° C., and if necessary heating means should be supplied to regulate the temperature.

After leaving the reactor the gases may first be passed through a small trap to remove any high-boiling by-products, and then in turn over a mass of anhydrous alkali metal fluoride to remove hydrofluoric acid by formation of the acid alkali metal fluoride and through a cold trap at −50° C. to remove unchanged acetone and fluoroacetone. The residual gases, which will be mainly trifluoroacetyl fluoride diluted with nitrogen, are then warmed up to ordinary temperature and then contacted with dilute aqueous caustic soda, as by bubbling the gases through the caustic soda in a vessel, or by passing the gases up a tower down which caustic soda is flowing. If desired, the gases leaving the vessel containing caustic soda may be passed through a trap at liquid air temperatures to absorb any traces of trifluoroacetyl fluoride which remain, and are then vented to the atmosphere.

The sodium trifluoroacetate in the liquid which has been contacted with the reaction product may be recovered in any suitable manner. Thus, the liquor may be neutralised with hydrochloric acid, the liquor evaporated to dryness, and the desired sodium salt extracted with a lower aliphatic alcohol, for example ethyl alcohol. Trifluoroacetic acid may be prepared from the sodium salt in known manner, e. g., by steam distilling an aqueous solution of the salt acidified with an excess of sulphuric acid, and subsequent fractionation of the distillate. The sodium salt may be converted to a lower alkyl ester by reaction with the corresponding alkyl iodide, and the ester may in turn be converted to the amide by treatment with ammonia.

The following example illustrates but does not limit the invention, all parts being by weight:

Example

A mixture of acetone vapour and nitrogen made by passing nitrogen into acetone at ordinary temperature (20° C.) was heated to 200° C. by passage through a preheater, and then passed into the upper part of an iron reactor packed with gold-plated copper turnings. A separate stream of fluorine, diluted with approximately an equal volume of nitrogen, and heated to 200° C. was also passed into the upper part of the reactor so as to mingle with the acetone. The gases were so proportioned that the vessel contained a small excess of fluorine in the exit gases. The reactor was heated to maintain a temperature of 215° C. The reacted gases were withdraw from the lower part of the reactor and after passage through a small trap to remove high-boiling liquids were passed up a tower packed with lumps of potassium fluoride, and then through a trap cooled with solid carbon dioxide to approximately —50° C. The gases leaving the trap were allowed to warm up to room temperature and then passed through three vessels in series containing 5 N aqueous caustic soda so that the gases bubbled through the liquid. The gas leaving the last vessel in the series was passed through a trap cooled with liquid air and was then allowed to leave the system.

After 192 parts of acetone had passed through the system the process was stopped. A small amount of aqueous caustic soda was then gradually introduced into the liquid air trap to decompose the small amount of trifluoroacetyl fluoride which had collected and, after warming, the resultant solution was added to the liquids from the three vessels into which caustic soda had been put. The combined liquids were neutralised with aqueous hydrochloric acid, the resultant liquor evaporated to dryness, and the residue extracted with 600 parts of hot ethyl alcohol. On evaporating the alcohol from the extract 100 parts of sodium trifluoroacetate were obtained.

We claim:

1. A process for the production of a member of the group consisting of alkali metal salts of trifluoroacetic acid and alkaline earth metal salts of trifluoroacetic acid which comprises reacting acetone with fluorine in the vapour phase in the presence of a diluent gas inert to fluorine and in a reaction vessel containing a catalyst mass selected from the group consisting of silver and gold, the reactants being preheated to about 200° C. and the temperature of the reaction vessel being maintained at a temperature within the range 200° to 250° C. and subsequently reacting trifluoroacetyl fluoride in the reaction product with an aqueous solution of a base.

2. A process for the production of a member of the group consisting of alkali metal salts of trifluoroacetic acid and alkaline earth metal salts of trifluoroacetic acid which comprises passing separate streams of acetone vapour and fluorine heated to about 200° C., one of said streams being diluted with a gas inert to fluorine, into a reaction vessel packed with a metallic fluorination catalyst selected from the group consisting of silver and gold and maintained at from 200° to 250° C., and subsequently reacting trifluoroacetyl fluoride in the reaction product with an aqueous solution of a base.

3. A process according to claim 1 in which the ratio of acetone to fluorine entering the reaction vessel is regulated so that the gases leaving the reaction vessel contain unreacted fluorine.

4. A process for the production of the sodium salt of trifluoroacetic acid which comprises passing separate streams of acetone vapour and fluorine heated to about 200° C., one of said streams being diluted with nitrogen, into a reaction vessel maintained at a temperature between 200° and 250° C. packed with gold-plated copper in divided form, and subsequently reacting trifluoroacetyl fluoride in the reaction product with aqueous sodium hydroxide.

5. A process for the production of the sodium salt of trifluoroacetic acid which comprises reacting acetone with fluorine in the ratio of 1 mol. acetone to 10–12 mols. fluorine in the vapour phase in a reaction vessel maintained at from 200° to 250° C. and packed with a metallic catalyst selected from the group consisting of silver and gold, contacting the gases leaving the reaction vessel successively with a solid alkali metal fluoride to remove HF, and with a surface cooled to about —50° C. to remove acetone and fluoroacetone, and subsequently reacting the residual gases containing trifluoroacetyl fluoride with an aqueous solution of sodium hydroxide.

6. A process according to claim 1 wherein the base is sodium hydroxide.

7. A process for the production of a member of the group consisting of alkali metal salts of trifluoroacetic acid and alkaline earth metal salts of trifluoracetic acid, which comprises passing separate streams of acetone vapour and fluorine, each of said streams being diluted with a gas inert to fluorine and preheated to about 200° C., into a reaction vessel packed with a metallic fluorination catalyst selected from the group consisting of silver and gold the reaction vessel being maintained at 200° to 250° C., and subsequently reacting trifluoroacetyl fluoride in the reaction product with an aqueous solution of a base.

8. A process according to claim 7 in which the ratio of acetone to fluorine entering the reaction vessel is regulated so that the gases leaving the reaction vessel contain unreacted fluorine.

9. A process for the production of the sodium salt of trifluoroacetic acid which comprises passing separate streams of acetone vapour and fluorine, each of said streams being diluted with nitrogen, into a reaction vessel maintained at a temperature between 200° C. and 250° C. packed with gold plated copper in divided form, and subsequently reacting trifluoroacetyl fluoride in the reaction product with aqueous sodium hydroxide.

WALTER NORMAN HAWORTH.
MAURICE STACEY.

REFERENCES CITED

The following references are of record in the file of this patent:

UNITED STATES PATENTS

| Number | Name | Date |
|---|---|---|
| 2,378,048 | Theobald | June 12, 1945 |

OTHER REFERENCES

Humiston, J. Phys. Chem., vol. 23, pages 572–577 (1919).

Fukuhara et al., J. Am. Chem. Soc., vol. 63, pp. 788–791 (1941).

Adams et al., "Organic Reactions," vol. II (Wiley), pp. 70, 74 (1944).